United States Patent
Ganeriwal et al.

(10) Patent No.: US 11,283,672 B2
(45) Date of Patent: Mar. 22, 2022

(54) FORWARDING DETECTION OF AN AGGREGATED INTERFACE

(71) Applicant: Juniper Networks, Inc., Sunnyvale, CA (US)

(72) Inventors: Gaurav Ganeriwal, Santa Clara, CA (US); Sharmila Koppula, Cupertino, CA (US); Babu Singarayan, San Jose, CA (US); Vishnu Janardhanan S, Bangalore (IN); Sayantani Gupta, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 861 days.

(21) Appl. No.: 15/989,961

(22) Filed: May 25, 2018

(65) Prior Publication Data
US 2019/0363927 A1    Nov. 28, 2019

(51) Int. Cl.
| H04L 12/24 | (2006.01) |
| H04L 12/26 | (2006.01) |
| H04L 41/0654 | (2022.01) |
| H04L 43/0811 | (2022.01) |
| H04L 43/10 | (2022.01) |

(52) U.S. Cl.
CPC ...... *H04L 41/0654* (2013.01); *H04L 43/0811* (2013.01); *H04L 43/10* (2013.01)

(58) Field of Classification Search
CPC ... H04L 41/0654; H04L 43/0811; H04L 43/10
See application file for complete search history.

(56) References Cited

U.S. PATENT DOCUMENTS

| 5,437,019 A * | 7/1995 | Brockmann ........ G06F 12/0676 |
| | | 711/5 |
| 10,122,617 B2 * | 11/2018 | Hu ....................... H04L 43/0811 |
| 2007/0177662 A1 * | 8/2007 | Jain ....................... H04L 1/0071 |
| | | 375/222 |
| 2007/0207591 A1 * | 9/2007 | Rahman ................ H04L 45/28 |
| | | 438/439 |

(Continued)

OTHER PUBLICATIONS

Extended Search Report from counterpart European Application No. 19165863.2, dated Oct. 1, 2019, 9 pp.

(Continued)

*Primary Examiner* — Christopher M Crutchfield
*Assistant Examiner* — Tito Q Pham
(74) *Attorney, Agent, or Firm* — Shumaker & Sieffert, P.A.

(57) ABSTRACT

The techniques describe detecting connectivity failure of an aggregated interface. To monitor connectivity of the aggregated interface, a packet processor of a plurality of packet processors is set as a session master responsible for managing an active forwarding plane connectivity detection session with a peer session master node. The other local packet processors of the virtual network node are selected as session standby nodes that each have a passive forwarding plane connectivity detection session running to the peer session master node. If a session master node goes down (i.e., by link or node failure), one of the local session standby nodes may detect the failure and is set as a new session master node by activating its passive session having the same session parameters.

35 Claims, 9 Drawing Sheets

(56) References Cited

U.S. PATENT DOCUMENTS

| | | | |
|---|---|---|---|
| 2013/0084063 A1* | 4/2013 | Hu | H04L 49/10 |
| | | | 398/2 |
| 2014/0029419 A1* | 1/2014 | Jain | H04L 41/0659 |
| | | | 370/228 |
| 2016/0014032 A1* | 1/2016 | Ao | H04L 47/125 |
| | | | 370/236 |
| 2017/0005915 A1* | 1/2017 | Mirsky | H04L 69/40 |
| 2018/0183667 A1* | 6/2018 | Dubey | H04L 41/0663 |
| 2019/0089627 A1* | 3/2019 | Mirsky | H04L 45/50 |
| 2020/0162283 A1* | 5/2020 | Mo | H04L 43/0852 |
| 2020/0326971 A1* | 10/2020 | Yang | H04L 69/161 |

OTHER PUBLICATIONS

Bhatia et al. "Bidirectional Forwarding Detection (BFD) on Link Aggregation Group (LAG) Interfaces" Internet Engineering Task Force (IETF), RFC 7130, Feb. 2014, 11 pp.

Katz et al. "Bidirectional Forwarding Detection (BFD)" Internet Engineering Task Force (IETF), RFC 5880, Jun. 2010, 49 pp.

Katz et al. "Bidirectional Forwarding Detection (BFD) for IPv4 and IPv6 (Single Hop)" Internet Engineering Task Force (IETF), RFC 5881, Jun. 2010, 7 pp.

IEEE Std. 802.3ad-2000, "Amendment to Carrier Sense Multiple Access with Collision Detection (CSMA/CD) Access Method and Physical Layer Specifications—Aggregation of Multiple Link Segments," Mar. 30, 2000, 182 pp.

Response to Extended Search Report dated Oct. 1, 2019 from counterpart European Application No. 19165863.2, filed May 27, 2020, 11 pp.

\* cited by examiner

FORWARDING DETECTION OF AN AGGREGATED INTERFACE

TECHNICAL FIELD

The disclosure relates to computer networks and, more specifically, to forwarding packets within computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain network devices, referred to as routers, maintain routing information representative of a topology of the network. The routers exchange routing information so as to maintain an accurate representation of available routes through the network. A "route" can generally be defined as a path between two locations on the network.

Routers may define "virtual" or "logical" links, and map the virtual links to the physical links. In some cases, these links may be logically grouped or aggregated together to form an "aggregated bundle." For example, a network node may be connected to another network node via an aggregated bundle of multiple physical links. In some cases, these links may be combined into one logical interface (otherwise referred to as "aggregated interface") for higher bandwidth and redundancy.

Routers may also be virtualized into multiple virtual network nodes by apportioning hardware resources of the router. The virtual network nodes may include one or more packet processors interconnected by an internal switch fabric. Packet processors receive and send data with other external devices via interface cards. The switch fabric provides an internal interconnect mechanism for forwarding data within the router between the packet processors for ultimate transmission over a network. In some examples, a router or switching device may employ a distributed, multi-stage switch fabric architecture, in which network packets traverse multiple stages of the switch fabric located in distributed packet processors of the router to travel from an ingress point of the switch fabric to an egress point of the switch fabric.

SUMMARY

In general, this disclosure describes techniques for detecting connectivity failure of an aggregated interface. In some examples, a network device such as a router may be virtualized into multiple virtual network nodes by apportioning hardware resources of the router, such as packet processors, among the multiple virtual network nodes. In this example, an aggregated interface, such as an abstract fabric interface, includes a logical link construct that provides connectivity between multiple virtual network nodes, using underlying physical fabric links of a switch fabric between packet processors. Source packet processors may forward incoming data across the internal switch fabric via the AF link towards a destination packet processor for ultimate transmission over a network.

In some examples, one or more links of the aggregated interface may fail. To monitor connectivity of the aggregated interface, a packet processor of a plurality of packet processors is set as a session master responsible for managing an active forwarding plane connectivity detection session with a peer session master node. The other local packet processors of the virtual network node are selected as session standby nodes that each have a passive forwarding plane connectivity detection session running to the peer session master node. If a session master node goes down (i.e., by link or node failure), one of the local session standby nodes may detect the failure and is set as a new session master node by activating its passive session having the same session parameters.

The techniques described herein may provide one or more technical advantages. For example, the techniques described herein may support multiple applications on an abstract fabric (AF) interface, such as state management of physical interface devices (i.e., monitoring control and data path connectivity of an AF interface and used to mark the AF interface as down if a peer end is not reachable), trigger fast reroute (FRR) on an AF interface should the AF interface be disabled or deleted, and support user configured multi-hop or single-hop BFD protocol going via an AF interface. The techniques described herein may be used to monitor connectivity of any directly connected multipoint virtual interface/link. Moreover, the techniques described herein provide a robust way of monitoring the multipoint link by preventing false session flaps in event of packet processors going up or down. Further, the techniques described herein may work seamlessly on a scaled setup with a large number of packet processors since only one active forwarding plane connectivity detection session per connection is established.

The details of one or more examples of the techniques described herein are set forth in the accompanying drawings and the description below. Other features, objects, and advantages of the techniques described herein will be apparent from the description and drawings, and from the claims.

DETAILED DESCRIPTION

Figure 1:
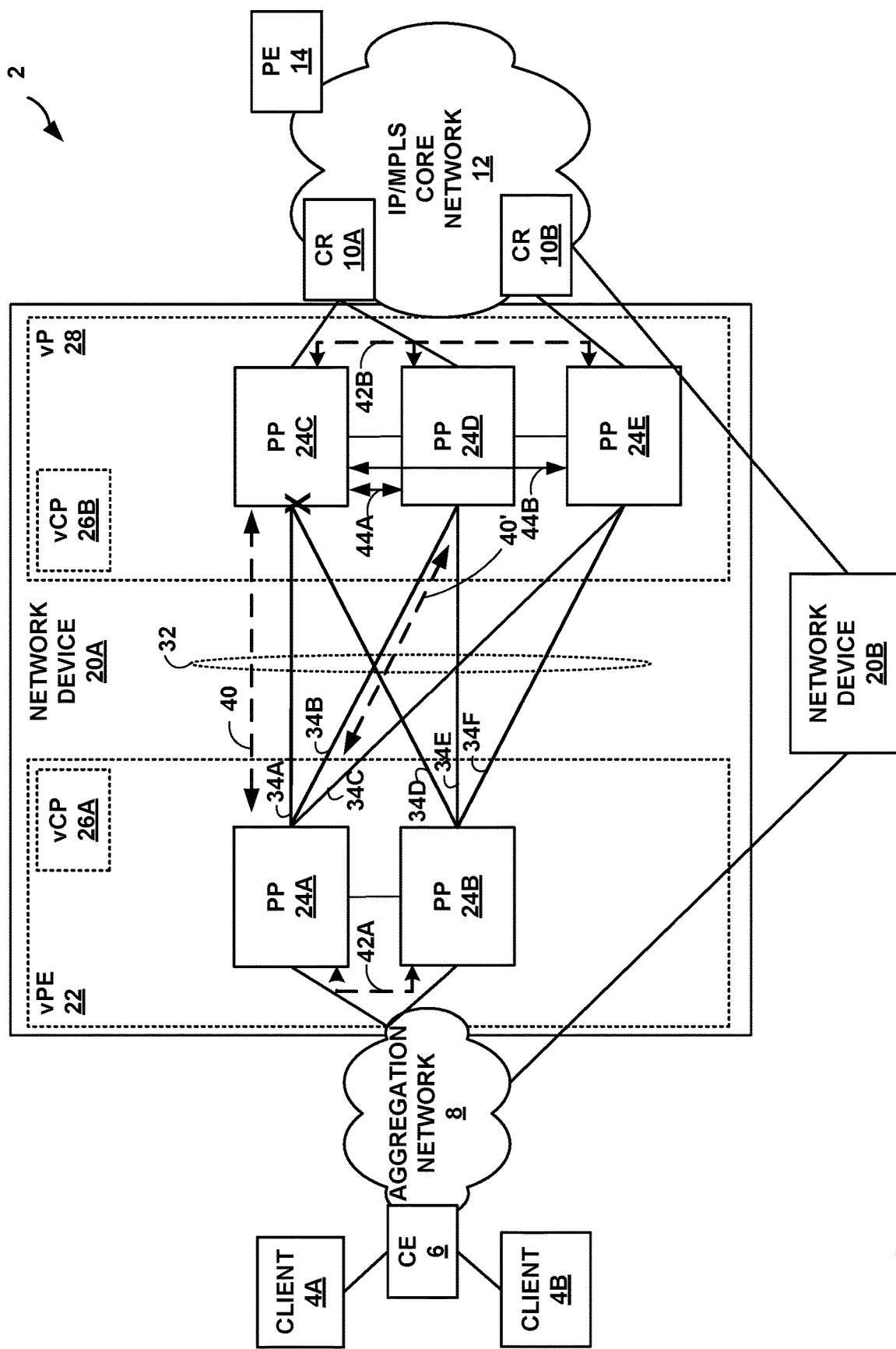
FIG. 1 is a block diagram illustrating an example network environment that includes a logical view of a network device configured in accordance with techniques described in this disclosure.

FIG. 1 is a block diagram illustrating an example network environment 2 that includes a logical view of a network device 20A configured in accordance with techniques described in this disclosure. For purposes of example, the techniques of this disclosure are described with respect to a simplified network environment 2 of FIG. 1 in which network devices 20A, 20B (e.g., routers) communicate with core routers (CR) 10A-10B ("core routers 10") to provide client devices 4A-4B ("client devices 4") with access to services provided by devices in Internet Protocol (IP)/Multi-Protocol Label Switching (MPLS) core network 12.

The configuration of network environment 2 illustrated in FIG. 1 is merely an example. Although not illustrated as such, IP/MPLS core network 12 may be coupled to one or more networks administered by other providers, and may thus form part of a large-scale public network infrastructure, e.g., the Internet. Aggregation network 8 may be viewed as an access network to the Internet. A service provider network may provide computing devices coupled to client devices 4 with access to the Internet, and may allow the computing devices within customer networks (not shown) to communicate with each other. In another example, IP/MPLS core network 12 may provide network services within the core of the Internet. In either case, IP/MPLS core network 12 may include a variety of network devices (not shown) other than network devices 20, provider edge (PE) router 14, and core routers 10, such as additional routers, switches, servers, or other devices.

Client devices 4 may be devices associated with one or more customer networks (not shown) coupled to customer edge (CE) router 6. In some examples, client devices 4 may include computing devices, such as personal computers, laptop computers, handheld computers, workstations, servers, switches, printers, customer data centers or other devices, for example. In other examples, client devices 4 may be endpoint devices such as a switch, a router, a gateway, or another terminal that operates as a demarcation point between customer equipment, such as subscriber devices, and service provider equipment. In one example, client devices 4 may comprise a digital subscriber line access multiplexer (DSLAM) or other switching device. For example, client devices 4 may be connected to one or more wireless radios or base stations (not shown) to wirelessly exchange packetized data with subscriber devices. Client devices 4 may comprise a switch, a router, a gateway, or another terminal that aggregates the packetized data received from the wireless radios to CE router 6. In some examples, aggregation network 8 may include an optical access network. For example, CE router 6 may comprise an optical line terminal (OLT) connected to one or more client devices 4 or optical network units (ONUs) via optical fiber cables.

Client devices 4 may be access nodes coupled to customer networks and subscriber devices. Client devices 4 are clients of services provided by PE router 14. In this example, a service provider network includes client devices 4 and customer edge (CE) router 6 that provide subscriber devices with access to aggregation network 8. In some examples, CE router 6 may comprise a router that maintains routing information between subscriber devices and aggregation network 8. CE router 6, for example, may include Broadband Remote Access Server (BRAS) functionality to aggregate output from one or more client devices 4 into a higher-speed uplink to aggregation network 8.

In the example of FIG. 1, network device 20A includes multiple routing components (e.g., routing processes) and packet processors of a forwarding component (otherwise referred to herein as "packet forwarding engines (PFEs)") that are physically coupled and configured to operate as separate logical routers. In the example of FIG. 1, network device 20 includes a virtual provider edge (vPE) node 22 ("vPE 22") and virtual core router (vP) node 28 ("vP 28"), which are cooperative virtual routing components operating as multiple distinct nodes from the perspective of network devices external to network device 20A. Network device 20A may be a single-chassis router having a single physical chassis, which is virtualized into multiple virtual network nodes (referred to as "vNodes" or Guest Network Functions (GNFs)) by apportioning hardware resources of the router, such as packet processors 24A-24E (collectively, "PPs 24"), among the respective virtual network nodes. In the example of FIG. 1, vPE 22 may include PPs 24A-24B and vP 28 may include PPs 24C-24E. Individual PPs 24 are assigned to a particular vNode and are not shared among multiple vNodes. The virtual network nodes illustrated in FIG. 1 are merely an example. Each of the virtual network nodes may include more or less packet processors.

To core routers 10 and CE router 6 of network environment 2, network device 20A appears as multiple routing devices, specifically, vPE router 22 and vP router 28. For example, although network device 20A includes a single chassis, from the perspective of core routers 10, network device 20A has multiple externally-advertised network addresses and maintains multiple peer routing sessions for each routing protocol maintaining peer routing sessions with each of the core routers 10.

Each of respective control planes (vCP) 26A-26B ("vCPs 26") of the corresponding vNodes instantiates with virtual machine (VM) technology. The vCP 26 either could be within the control unit (e.g., routing component) of network device 20A or outside the routing component. Each vNode could serve the role of different network functions, such as Internet service provider edge (PE), Virtual Private Network (VPN) service PE and Multiprotocol Label Switching (MPLS) Label Switching Router (LSR). Apart from these vNodes, in some examples network device 20A may also include an administrative VM instantiated for shared resources management (e.g., a management plane, not shown in FIG. 1).

Between two vNodes in network device 20A, one logical layer-3 link is provisioned that is visible to devices external to network device 20A. For example, in FIG. 1, abstract fabric interface (AF) link 32 ("AF link 32") provides a logical link between vPE 22 and vP 28. AF link 32 is layer-3 logical link construct and provides vNode to vNode connectivity. AF link 32 bundles fabric interconnects that connect the same vNodes. AF link 32 provides a single logical link connectivity between the vNodes, and could have many layer-1, layer-2, or layer-3 fabric bundling within, depending on implementation.

AF link 32 includes fabric interconnects 34A-34F (collectively, "fabric interconnects 34"). Fabric interconnects 34 terminate at fabric interfaces of one of PPs 24. In the example of FIG. 1, PP 24A may include fabric interconnects 34A-34C that terminate at PPs 24C-24E, respectively. PP 24B may include fabric interconnects 34D-34F that terminate at PPs 24C-24E, respectively. The fabric interconnects 34 may, in some examples, have identifiers, which are not generally advertised to devices external to network device 20. The fabric interconnects 34 are modelled as point-to-point Ethernet links between a pair of PPs 24.

In some examples, connectivity between vPE 22 and vP 28 may go down; that is, one or more fabric interconnects 34 may become unavailable. A connectivity detection protocol such as Bi-directional Forwarding Detection (BFD) may be used to detect a connectivity failure between two adjacent systems, including interfaces and data links. For example, in BFD operation, nodes exchange hello packets at a specified time interval and detect a neighbor failure if no reply is received after the specified time interval. Further examples of BFD are described in Katz, D., et. al., "Bidirectional Forwarding Detection (BFD)," Request for Comments 5880, June 2010, and Katz, D., et. al., "Bidirectional Forwarding Detection (BFD) for IPv4 and IPv6 (Single Hop)," Request for Comments 5881, June 2010, the contents of each of which is incorporated by reference herein. However, BFD is a connectivity detection protocol limited to monitoring failure on point-to-point links and is unable to detect all links of an aggregated interface. This may lead to false interface flaps in which the aggregated interface may be incorrectly set to an operational down state despite the aggregated interface having other viable links.

To monitor connectivity of an aggregated interface, network devices may use micro BFD (mBFD) to monitor the status of each individual link of the aggregated interface. For example, a separate respective control plane mBFD session may be established for each link of the aggregated interface. Further examples of mBFD are described in Bhatia, M., et. al., "Bidirectional Forwarding Detection (BFD) on Link Aggregation Group (LAG) Interfaces," IETF, February 2014, the contents of which is incorporated by reference in its entirety. However, resources are wasted because a control plane mBFD session is configured for each of the individual links of the aggregated interface.

In accordance with the techniques described herein, network device 20A may select session master nodes and session standby nodes such that only a single control plane connectivity detection session running on an aggregated interface is active for detecting connectivity failures of an aggregated interface. For example, during initialization, network device 20A may initiate a session master node selection process to select a session master node and one or more session standby nodes for each virtual network node. In the example of FIG. 1, network device 20A may select PP 24A as a session master node for vPE 22 and select PP 24C as a session master node for vP 28. In some instances, network device 20A may select a session master node based on a packet processor having the lowest slot (e.g., for node virtualization environments). In other instances, selection of a session master node may be application specific. In other instances, network device 20A may manually select a session master node. In any event, session master nodes are set up to manage an active forwarding plane connectivity detection session, e.g., active mBFD session 40, to detect connectivity failures of a multipoint-to-multipoint interface, e.g., AF link 32. That is, session master nodes PP 24A and PP 24C are set up to exchange control packets to detect connectivity failures of AF link 32 (referred to herein as "connectivity detection messages," e.g., "keepalive" messages). Although the examples are described above with respect to abstract fabric interfaces, the techniques described herein may similarly be applied to any type of aggregated interfaces (e.g., Logical Tunnel Interfaces, Aggregated Ethernet interfaces, etc.), as further described in FIG. 7.

Network device 20A may select the remaining packet processors as session standby nodes (otherwise referred to herein as "session standby packet processors"). In the example of FIG. 1, PP 24B is selected as a session standby node for vPE 22, and PP 24D and PP 24E are selected (i.e., set) as session standby nodes for vP 28. As further described below, session standby nodes may perform dynamic anchoring. That is, session standby nodes may determine whether the local session master node is down, and if the session master node is down, the session standby nodes may trigger a session master node selection process (e.g., by local repair in the forwarding plane or informing a control plane) in which a session standby node is converted to a new session master node. As one example, session standby nodes PP 24D and PP 24E may exchange local connectivity packets 44A, 44B (collectively, "local connectivity packets 44"), respectively, with session master node PP 24C to determine the connectivity status of session master node PP 24C (i.e., whether PP 24C is up or down). For instance, each session standby node may, for example, exchange, e.g., heartbeat packets, with the session master node. In the example of FIG. 1, session master node PP 24C and session standby node PP 24D may exchange local connectivity packets 44A (e.g., heartbeat packets). Similarly, session master node PP 24C and session standby node PP 24E may exchange local connectivity packets 44B.

Network device 20A may establish a single active forwarding plane connectivity detection session, e.g., active mBFD session 40, between session master nodes PP 24A and PP 24C and one or more passive forwarding plane connectivity detection sessions, e.g., passive mBFD sessions, between the one or more session standby nodes, e.g., PP 24D and PP 24E). For example, vCP 26B of network device 20A may establish an mBFD passive session 40' between session standby node PP 24D and its peer session master node PP 24A. Passive session 40' may have the same session parameters as that of the mBFD active session 40, but is not running in the mBFD state machine. Although not shown in FIG. 1, network device 20 may establish another passive forwarding plane connectivity detection session between session standby node PP 24E and session master node PP 24A.

To establish passive mBFD session 40', BFD session parameters unique to active mBFD session 40 may be synchronized to each of session standby nodes PPs 24B, 24D, and 24E. BFD session parameters may include, for example, My Discriminator, Your Discriminator, destination IP address, and source IP address, as described in Request for Comments 5880, entitled "Bidirectional Forwarding Detection (BFD)," as incorporated above. In the example of FIG. 1, PP 24C may, following an initialization state, trigger a synchronization (shown as 42B in FIG. 1) of session parameters with PP 24D and PP 24E. This synchronization may provide the identity of the local master node to all the local standby nodes and enable a standby node to become the session master node if the current session master node goes down. Similarly, PP 24A may synchronize (shown as 42A in FIG. 1) session parameters with PP 24B. By synchronizing the BFD session parameters, the session standby nodes are capable of activating the passive session in the event the current session master node goes down.

In the node virtualization environment, peer packet forwarding elements may be known at each end. In this way, by implementing a single active mBFD session 40, each of session master nodes, e.g., PP 24A and PP 24C, may send the control packet directly to its peer session master node. For example, session master node PP 24A may have information (i.e., knowledge of end nodes, peer nodes, which nodes are in lowest slot, etc.) about session master node PP 24C such that session master node PP 24A may send a control packet directly to session master node PP 24C. Similarly, session master node PP 24C may include information about session master node PP 24A such that session master node PP 24C may send a control packet directly to session master node PP 24A. For example, PP 24A knows that PP 24C, PP 24D and PP 24E are peer resources. PP 24A also knows PP 24C is at lowest slot and hence is working as session master at the other end. Thus, control packets can be forwarded directly from PP 24A to PP 24C.

Alternatively, or additionally, if the peer session master node is unknown, session master node PP 24A may load balance a control packet (e.g., mBFD control packet) to any of PPs 24C-24E, which is then steered upon receipt to the session master node where the mBFD state machine is running. This may be the case for aggregate Ethernet interfaces, for example. In general, if the peer master node is unknown, control packets can be forwarded to any peer resource and the peer resource will steer control packet to the local master. For example, session standby nodes PP 24D and PP 24E may each be configured to steer (e.g., using filters) a control packet received from session master node PP 24A to local session master node PP 24C. Similarly, session master node PP 24C may load balance a control packet to any of PPs 24A-24B. If session standby node PP 24B receives the control packet, session standby node PP 24B may steer the control packet to the local session master node, e.g., PP 24A.

Alternatively, or additionally, each of session master nodes PP 24A and PP 24C may run in BFD "echo mode." For example, session master node PP 24C may generate an echo control packet that is forwarded to any of PPs 24A-24B, which in turn sends the echo control packet back along the same path to session master node PP 24C (i.e., loopback by the peer forwarding element having an active or passive mBFD session). Similarly, session master node PP 24A may generate an echo control packet that is forwarded to any of PPs 24C-24E, which in turn sends the echo control packet back along the same path to session master node PP 24A. In any event, session master nodes PP 24A and PP 24C are configured to transmit and receive connectivity detection messages for detecting connectivity failures of AF link 32 without having to establish mBFD sessions for each of fabric interconnects 34 of AF link 32.

To determine the connectivity status of a local session master node, session standby nodes PP 24D and PP 24E may exchange local connectivity messages 44A and 44B, respectively, with session master node PP 24C. In one example, session standby node PP 24D may determine based on local connectivity message 44A that session master node PP 24C is down (e.g., failing to receive a heartbeat message response). In response, session standby node PP 24D may trigger the session master node selection process to select one of session standby nodes, e.g., PP 24D or PP 24E, to become a new session master node. Various approaches may be used for selecting the session master node. As described above, in some examples a new session master node is selected based on the packet processor installed in the next lowest slot. In this example, PP 24D is installed on the next lowest slot and is selected as the new session master node. Although a new session master node is selected based on the next lowest slot, any of the session standby nodes (e.g., PPs 24D and 24E) may be selected as the new session master node. In any case, the new session master node, PP 24D, may convert its passive mBFD session 40' to an active mBFD session, and the overall control plane BFD session continues in an "up" state without interruption. In some examples, a session master node may selected based on a uniform distribution of sessions between child resources. For example, there may be multiple abstract fabric interfaces on a router (connected to different virtual routing nodes) sharing the same physical resources. In this example, session master node may be selected such that the sessions are uniformly distributed among physical resources. In other examples, the session master node may be selected based on other policies or criteria, such as by determining which node is in a highest slot number, based on a round robin selection scheme, or other bases.

The switching of mastership between forwarding elements will be transparent to the control plane and to the forwarding elements of the peer network node and does not impact the active session's state machine. In this way, the techniques described herein provide for a more robust detection of failures of an aggregated interface and a more expeditious reroute time for an aggregated interface (e.g., Fast Reroute (FRR) time of abstract fabric interface matches the FRR time of an aggregated Ethernet interface).

Figure 2:
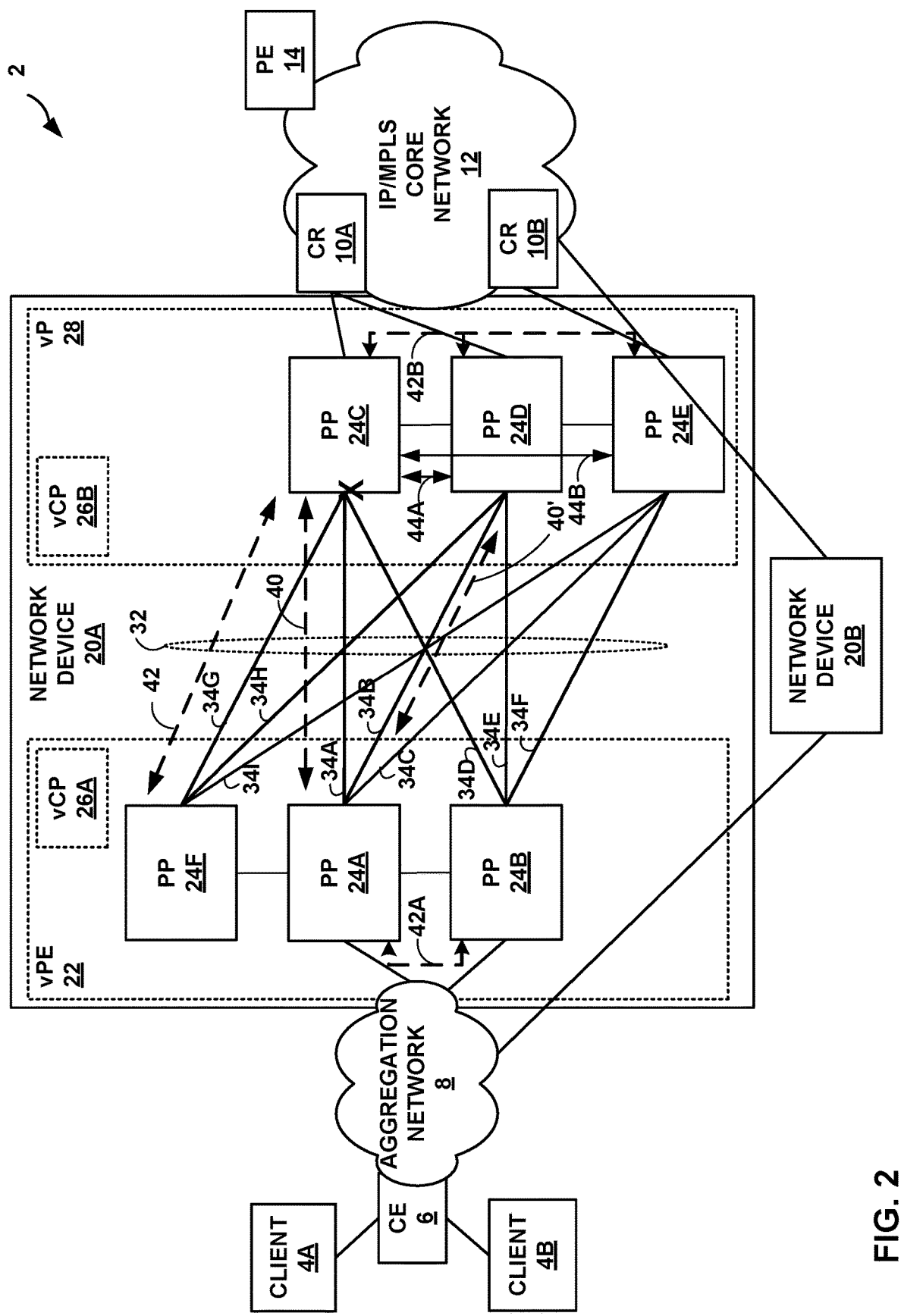
FIG. 2 is a block diagram illustrating another example network environment that includes an addition of a new session master node, in accordance with techniques described in this disclosure.

FIG. 2 is a block diagram illustrating another example network environment that includes an addition of a new session master node, in accordance with techniques described in this disclosure. Network device 20 of FIG. 2 is similar to network device 20 of FIG. 1, except as described below.

In the example of FIG. 2, PP 24A and PP 24C may initially be selected as the master session nodes and manage active mBFD session 40. A user may add a new packet processor that would take priority in the selection process as a new session master node, e.g., PP 24F, to vPE 22, where AF link 32 may further include fabric interconnects 34G-34I that terminate at PPs 24C-24E, respectively. In accordance with the techniques described herein, network device 20A may shift the active mBFD session 40 from current session master node PP 24A to the new session master node PP 24F, using, for example, Make Before Break (MBB) techniques to avoid interface flaps.

For example, the new session master node PP 24F may be installed in a lower slot than PP 24A. vCP 26A may detect the new session master node PP 24F, determine that the new session master node PP 24F takes priority over current session master node PP 24A, and may initiate a request to create a new active forwarding plane connectivity detection session, e.g., active mBFD session 42, on PP 24F. When PP 24F is capable of forwarding traffic, the new active mBFD session 42 may transition to an "up" state. When the new active mBFD session 42 is up, vCP 26A may initiate the deletion of previous active mBFD session, e.g., mBFD session 40, or in some examples, convert the previous active mBFD session 40 to a passive session. That is, the session standby nodes (e.g., PP 24A or PP 24B) may overwrite parameters of the passive forwarding plane connectivity detection session with new session parameters synchronized from the new session master node PP 24F. In this way, the techniques described herein may prevent any false flap during the session shift as both previous and new active mBFD sessions will continue to remain up during the complete transition period, therefore the overall control plane BFD session continues in an "up" state without interruption.

Figure 3:
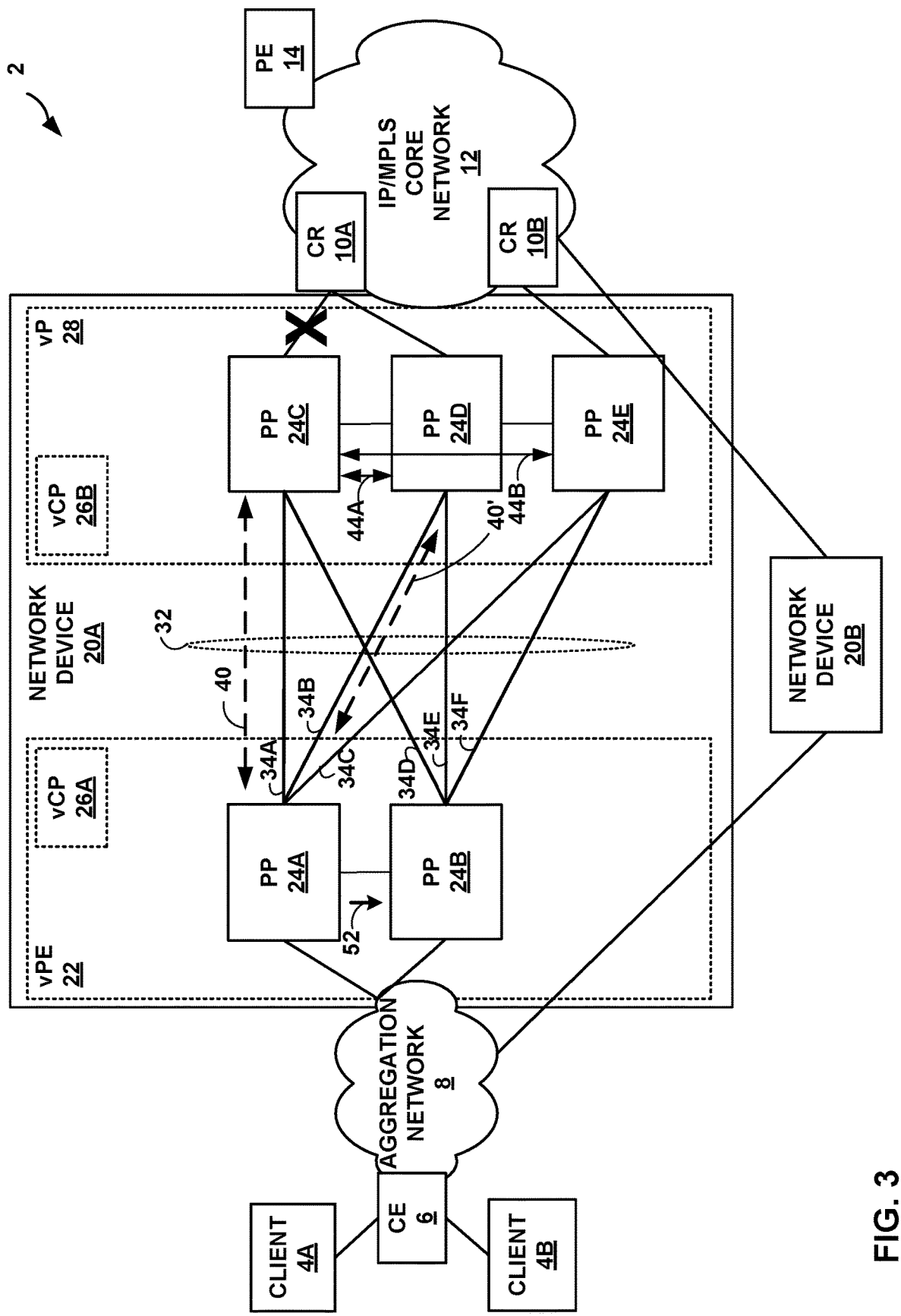
FIG. 3 is a block diagram illustrating another example network environment in which the aggregated interface is marked down, in accordance with techniques described in this disclosure.

FIG. 3 is a block diagram illustrating another example network environment in which the aggregated interface is down, in accordance with techniques described in this disclosure. Network device 20 of FIG. 3 is similar to network device 20 of FIG. 1, except as described below.

In the example of FIG. 3, a user may disable abstract fabric interface 32 of network device 20. Unlike physical interfaces (i.e., Ethernet interfaces) that typically use hardware signaling mechanisms to inform other nodes that the interface is down, a status control packet (e.g., "Admin Down" control packet) is used to signal other virtual nodes that the abstract interface is in an operational "down" state (i.e., marked down). Assume for example that PP 24A and PP 24C are session master nodes for vPE 22 and vP 28, respectively. A user may use a command line interface (CLI) (not shown) of network device 20 to disable AF link 32. In this example, vPE 22 may not be aware that AF link 32 is marked down. In this example, in the event that abstract fabric interface 32 is configured as disabled, the techniques described herein provide for an automatic provisioning of the mBFD session 40 on abstract fabric interface 32. For example, a loopback interface's IP address or a predefined private IP address can be used to create active mBFD session 40. In some examples, network device 20 may use a discovery protocol (e.g., Border Gateway Protocol (BGP) or Open Shortest Path First (OSPF)) which learns of an IP address of a peer node, e.g., session master node PP 24A, and establish a Bidirectional Forwarding Detection (BFD) session between the end points. In some examples, network device 20 may use a telemetry infrastructure between a virtual node and a base system (BSYS) to learn of an IP address of a peer node. In some examples, an application running on these systems will publish the IP address. Session master node PP 24C may send an "Admin Down" control packet via the active mBFD session 40 to inform vPE 22 that AF link 32 is marked down. In some examples, session master node PP 24A may also broadcast (shown as element 52 in FIG. 3) the Admin Down control packet to all local packet processors, e.g., PP 24B, for faster local repair in the forwarding plane of network device 20.

In response to receiving the Admin Down control packet, vPE 22 may mark the AF link 32 in the down state, which triggers a traffic reroute (e.g., fast reroute (FRR)) such that traffic can be rerouted to another network device, e.g., network device 20B. In this way, the techniques described herein provide for an expeditious reroute time for an aggregated interface (e.g., Fast Reroute (FRR) time of abstract fabric interface matches the FRR time of an aggregated Ethernet interface).

Figure 4:
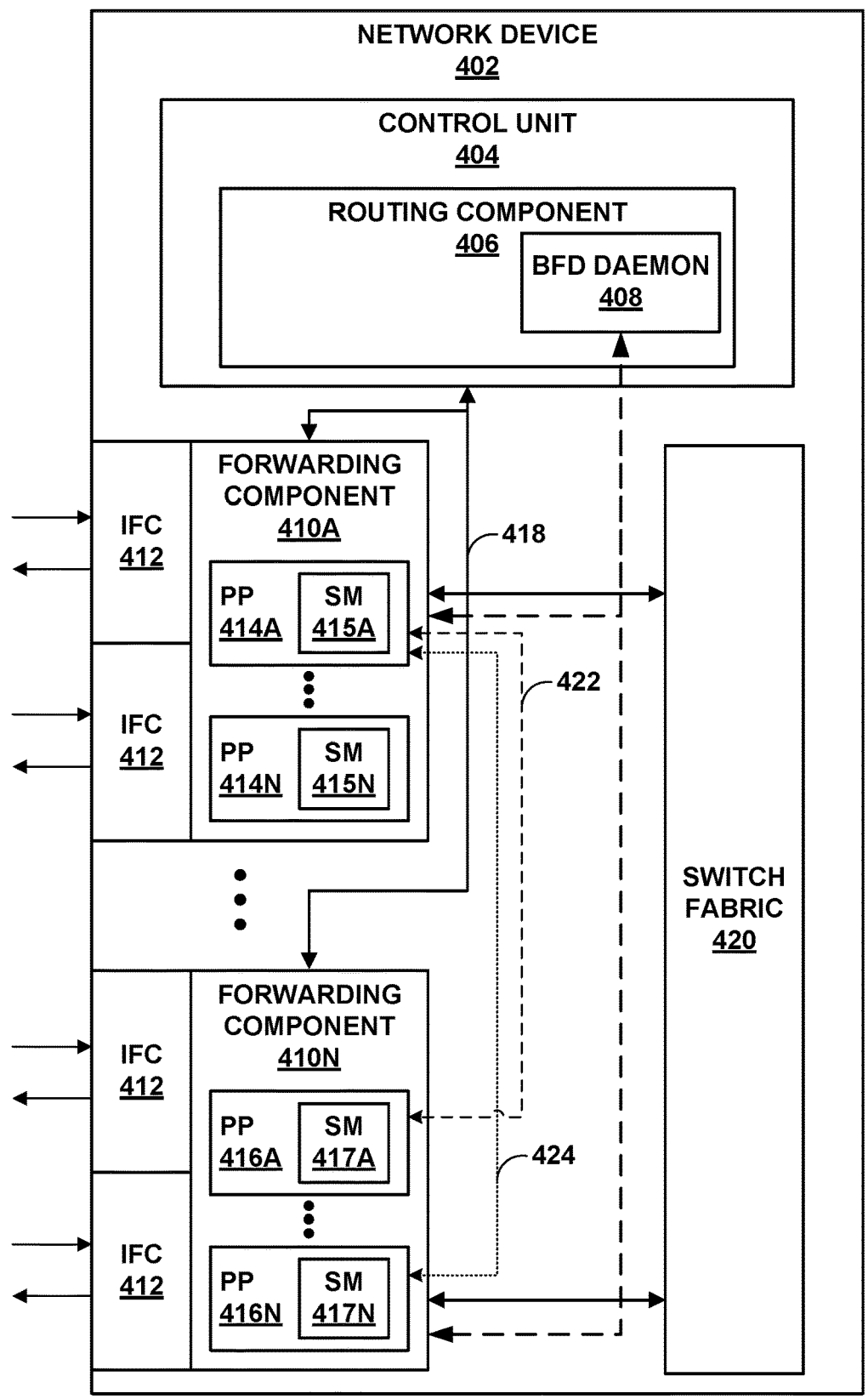
FIG. 4 is a block diagram illustrating an example network device, in accordance with the techniques described in this disclosure.

FIG. 4 is a block diagram illustrating an example network device 402, in accordance with the techniques described in this disclosure. Network device 402 may represent network device 20 of FIGS. 1-3, for example. Network device 402 may include multiple virtual nodes operating as, for example, virtual provider edge or virtual customer edge routers, virtual autonomous system border routers (ASBRs), virtual area border routers (ABRs), or another type of network device, such as a virtual switch.

In this example, network device 402 includes a control unit 404 that provides control plane functionality for network device 402. Control unit 404 may be distributed among multiple entities, such as one or more routing components and one or more service cards insertable into network device 402. In such instances, network device 402 may therefore have multiple control planes. In some examples, each virtual routing node of network device 402 may have its own virtual control plane, e.g., vCPs 26 of FIGS. 1-3.

Control unit 404 may include a routing component 406 that provides control plane functions, storing network topology in the form of routing tables, executing routing protocols to communicate with peer routing devices, and maintaining and updating the routing tables. Routing component 406 also provides an interface to allow user access and configuration of network device 402.

Network device 402 also includes a plurality of forwarding components in the form of example forwarding components 410A-410NN ("forwarding components 410") and a switch fabric 420, that together provide a forwarding plane for forwarding and otherwise processing subscriber traffic. Forwarding components 410 may be, for example, any of vPE 22 and vP 28 of FIGS. 1-3.

Control unit 404 is connected to each of forwarding components 410 by internal communication link 418. Internal communication link 418 may comprise a 100 Mbps or 1 Gbps Ethernet connection, for instance. Routing component 406 may execute daemons (not shown in FIG. 4), e.g., user-level processes that may run network management software, to execute routing protocols to communicate with peer routing devices, execute configuration commands received from an administrator, maintain and update one or more routing tables, manage subscriber flow processing, and/or create one or more forwarding tables for installation to forwarding components 410, among other functions.

Control unit 404 may include one or more processors (not shown in FIG. 4) that execute software instructions, such as those used to define a software or computer program, stored to a computer-readable storage medium (again, not shown in FIG. 4), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 404 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Forwarding components 410 receive and send data packets via interfaces of interface cards 412 each associated with a respective one of forwarding components 410. Each of forwarding components 410 and its associated ones of IFCs 412 may reside on a separate line card (not shown) for network device 402. Example line cards include flexible programmable integrated circuit (PIC) concentrators (FPCs), dense port concentrators (DPCs), and modular port concentrators (MPCs). Each of IFCs 412 may include interfaces for various combinations of layer two (L2) technologies, including Ethernet, Gigabit Ethernet (GigE), and Synchronous Optical Networking (SONET) interfaces. In various aspects, each of forwarding components 410 may comprise more or fewer IFCs. Switch fabric 420 provides a high-speed interconnect for forwarding incoming data packets to the selected one of forwarding components 410 for output over a network. Switch fabric 420 may include multiple fabric links, such as fabric links 34 of FIGS. 1-3.

In some examples, switch fabric 420 may be a distributed, multi-stage switch fabric architecture, in which network packets traverse multiple stages of the switch fabric located in distributed forwarding components of the router to travel from an ingress point of the switch fabric to an egress point of the switch fabric. As one example, switch fabric 420 may be implemented as a single multi-stage Clos switch fabric, which relays communications across the stages of the switch fabric. A typical multi-stage Clos switch fabric has a plurality of switches interconnected to form a plurality of stages. In a typical arrangement, the switch fabric includes an ingress (or "first") stage, one or more intermediate stages, and an egress (or "final") stage, with each stage having one or more switches (e.g., crossbar switches—often referred to more simply as "crossbars"). Moreover, the switch fabric may be implemented such that the switches are arranged as multiple parallel fabric planes that each provide independent forwarding from ingress ports to egress ports through the multiple stages, one or more of which may be treated as a spare fabric plane. In other words, each of the parallel fabric planes may viewed as an independent portion of the multi-stage Clos switch fabric, where each plane provides switching redundancy.

Forwarding components 410 process packets by performing a series of operations on each packet over respective internal packet processing paths as the packets traverse the internal architecture of network device 402. Operations may be performed, for example, on each packet by any of a corresponding ingress interface, an ingress forwarding components 410, an egress forwarding components 410, an egress interface or other components of network device 402 to which the packet is directed prior, such as one or more service cards. The result of packet processing determines the way a packet is forwarded or otherwise processed by forwarding components 410 from its input interface on one of IFCs 412 to its output interface on one of IFCs 412.

Forwarding components 410 may include one or more packet processors. For example, forwarding component 410A may include packet processors 414A-414N (collectively, "PPs 414") and forwarding component 410N may include packet processors 416A-416N (collectively, "PPs 416"). Packet processors 414 and 416 may include application-specific integrated circuit based packet processors ("ASICs") or any packet forwarding engine that execute the techniques described in this disclosure.

In accordance with the techniques described herein, routing component 406 may include a BFD daemon 408 that may initiate a session master node selection process to select one of PPs 414 of forwarding component 410A as a session master node and one or more of PPs 414 as a session standby node. Similarly, BFD daemon 408 may select one of PPs 416 of forwarding component 410N as a session master node and one or more of PPs 416 as a session standby node. In some examples, BFD daemon 408 may select a packet processor as a session master node based on a packet processor having the lowest slot. In some examples, session module 408 may manually select one of the packet processors as a session master node.

In the example of FIG. 4, an application may operate as a client to BFD daemon 408 as a BFD server, and the BFD client application selects PP 414A and PP 416A as session master nodes of forwarding components 410A and 410N, respectively. BFD daemon 408 may also establish an active forwarding plane connectivity detection session 422 (e.g., active mBFD session) between session master nodes PP 414A and PP 416A such that session master nodes PP 414A and PP 416A may exchange control packets to detect connectivity failures of the aggregated interface (e.g., abstract interface link 32 of FIG. 1). In some examples, different interfaces may adopt different methods to elect master/standby nodes.

BFD daemon 408 may select PP 414N and PP 416N as session master nodes of forwarding components 410A and 410N, respectively. BFD daemon 408 may select a passive forwarding plane connectivity detection session for each of session standby nodes PP 414N and PP 416N. In some examples, BFD daemon 408 may synchronize session parameters (e.g., My discriminator, Your discriminator, destination IP address, and source IP address) to session standby nodes PP 414N and PP 416N such that session standby node PP 416N is set up with a passive forwarding plane connectivity detection session 424 to master session node PP 414A. In some examples, the session parameters are synchronized in the forwarding plane itself (e.g., PP 414A informing directly to PP 414N) or via a process in control plane e.g., kernel/daemon (not shown) that operates as a client to BFD daemon 48.

In some examples, BFD daemon 408 may also detect the addition of packet processors in forwarding components 410. For example, BFD daemon 408 may determine that a new packet processor is installed on the lowest slot on forwarding component 410A. In this example, BFD daemon 408 may initiate a request to create a new active forwarding plane connectivity detection session between the new packet processor and session master node PP 416A. BFD daemon 408 may also initiate the deletion of a previous active forwarding plane connectivity detection session 422.

PPs 414 may include session modules 415A-415N (collectively, "SMs 415"), respectively, and PPs 416 may include session modules 417A-417N (collectively, "SMs 417"), respectively. Session standby nodes may use session modules to detect the connectivity status of local session master nodes. For example, PP 416N may use session module 417N to send a local connectivity message (e.g., heartbeat message) to PP 416A to determine the connectivity status of PP 416A. If session module 417N fails to receive a response, session module 417N may trigger a session master node selection process in which a standby session node (e.g., PP 416N) is set as a session master node and the passive forwarding plane connectivity detection session between PP 416N and PP 414A is activated.

In some examples, session modules 415 and 417 of session standby nodes may include instructions by which control packets are steered to a local session master node. As one example, session standby node PP 416N may receive a control packet from peer session master node PP 414A. Session module 417N may include instructions (i.e., filters) that cause session standby node PP 416N to steer the control packet to local session master node PP 416A.

In some examples, session modules 415 and 417 of session master nodes may include instructions by which status control packets (e.g., "Admin Down" control packets) are sent to a peer master session node to notify the peer master session node that an aggregated interface is marked down. In some examples, session modules 415 and 417 of session master nodes may include instructions by which the "Admin Down" control packet is broadcasted to peer session standby nodes to notify the peer session standby nodes that the aggregated interface is marked down.

Figure 5:
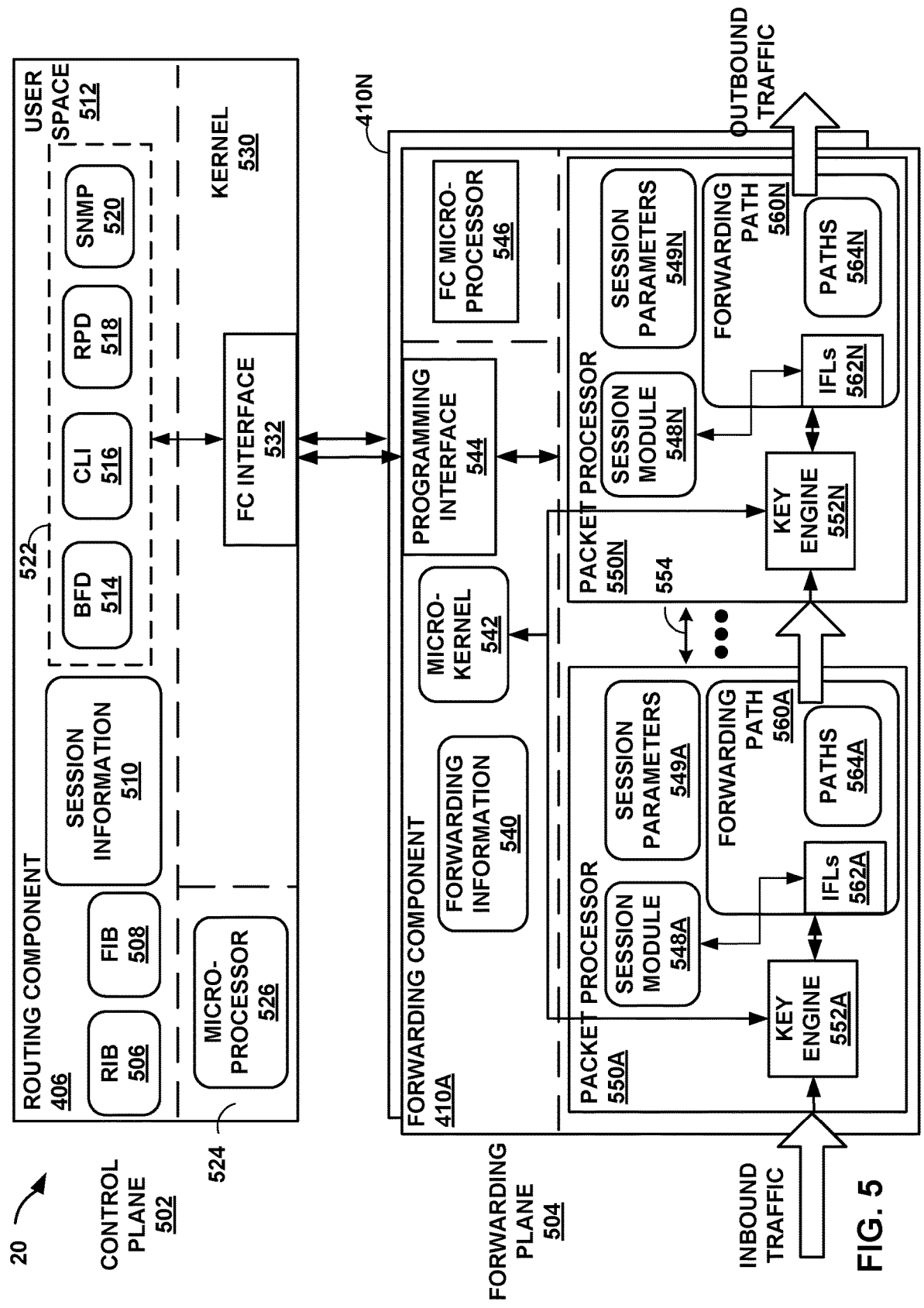
FIG. 5 is a block diagram illustrating components of the network device in further detail, in accordance with techniques described in this disclosure.

FIG. 5 is a block diagram illustrating example instances of routing component 406 and forwarding components 410 of routing engine 402 of FIG. 2 in further detail, in accordance with the techniques described herein. In this example, routing engine 402 provides a control plane 502 operating environment for execution of various user-level daemons 522 executing in user space 512. Daemons 522 are user-level processes that may run network management software, execute routing protocols to communicate with peer routing devices, execute configuration commands received from an administrator, maintain and update one or more routing tables, manage subscriber flow processing, and/or create one or more forwarding tables for installation to forwarding component 410A, among other functions. In this example, daemons 522 include BFD daemon 514, command-line interface daemon 516 ("CLI 516"), routing protocol daemon 518 ("RPD 518"), and Simple Network Management Protocol daemon 520 ("SNMP 520"). In this respect, control plane 502 may provide routing plane, service plane, and management plane functionality for network device 20 of FIG. 1. Various instances of routing component 406 may include additional daemons 522 not shown in FIG. 5 that perform other control, management, or service plane functionality and/or drive and otherwise manage forwarding plane functionality for network device 20.

Daemons 522 operate over and interact with kernel 530, which provides a run-time operating environment for user-level processes. Kernel 530 may comprise, for example, a UNIX operating system derivative such as Linux or Berkeley Software Distribution (BSD). Kernel 530 offers libraries and drivers by which daemons 522 may interact with the underlying system. Forwarding component interface 532 ("FC interface 532") of kernel 530 comprises a kernel-level library by which daemons 522 and other user-level processes or user-level libraries may interact with programming interface 544 of forwarding component 410A. FC interface 532 may include, for example, a sockets library for communicating with forwarding component 410A over dedicated network links.

Hardware environment 524 of routing component 406 comprises microprocessor 526 that executes program instructions loaded into a main memory (not shown in FIG. 5) from storage (also not shown in FIG. 5) in order to execute the software stack, including both kernel 530 and user space 512, of routing component 406. Microprocessor 526 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

RPD 518 executes one or more interior and/or exterior routing protocols to exchange routing information with other network devices and store received routing information in routing information base 506 ("RIB 506"). For example, RPD 518 may execute protocols such as one or more of Border Gateway Protocol (BGP), including interior BGP (iBGP), exterior BGP (eBGP), multiprotocol BGP (MP-BGP), Label Distribution Protocol (LDP), and Resource Reservation Protocol with Traffic-Engineering Extensions (RSVP-TE). RPD 518 may additionally, or alternatively, execute User Datagram Protocol (UDP) to send and receive data for various system resources, such as physical interfaces.

RIB 506 may include information defining a topology of a network, including one or more routing tables and/or link-state databases. RPD 518 resolves the topology defined by routing information in RIB 506 to select or determine one or more active routes through the network and then installs these routes to forwarding information base 508 ("FIB 508"). Typically, RPD 506 generates FIB 508 in the form of a radix or other lookup tree to map packet information (e.g., header information having destination information and/or a label stack) to next hops and ultimately to interface ports of interface cards associated with respective forwarding component 410A. Kernel 530 may synchronize FIB 508 of routing component 406 with forwarding information 540 ("FI 540") of forwarding component 410A.

Command line interface daemon 516 ("CLI 516") provides a shell by which an administrator or other management entity or user may modify the configuration of network device 20 using text-based commands. SNMP 520 comprises an SNMP agent that receives SNMP commands from a management entity to set and retrieve configuration and management information for network device 20. Using CLI 516 and SNMP 520, for example, management entities may enable/disable and configure services, manage classifications and class of service for packet flows, install routes, enable/disable and configure rate limiters, configure traffic bearers for mobile networks, enable/disable an aggregated interface (e.g., abstract fabric interface), and configure interfaces, for example. RPD 518, CLI 516, and SNMP 520 in this example configure forwarding plane 504 via FC interface 532 to implement configured services, and/or add/modify/delete routes. FC interface 532 allows daemons 522 to drive the installation and configuration of session master node and session standby nodes of forwarding components 410. In particular, FC interface 532 includes an application programming interface (API) by which daemons 522 may synchronize session parameters (e.g., BFD session parameters) to session standby nodes.

BFD daemon 514 may be configured to implement one or more of the bidirectional forwarding detection protocol and micro BFD protocol to detect faults between peer nodes. In some examples, BFD daemon 514 may drive the selection of a session master node and one or more session standby nodes.

Forwarding component 410A, in combination with other forwarding components 410 of network device 20, implements forwarding plane 504 (also known as a "data plane") functionality to establish session master/standby nodes, detect connectivity status of peer nodes, and convert to a session master node upon the detection that a current session master node is down. Forwarding plane 504 determines data packet forwarding through network device 20, applies services, rate limits packet flows, filters packets, and otherwise processes the packets using service objects and lookup data installed by control plane 502 to forwarding plane 504. Although FIG. 5 illustrates only forwarding component 410A in detail, each of forwarding components 410 of network device 20 comprises similar modules that perform substantially similar functionality.

Forwarding component 410A includes packet processors PP 550A-550N (collectively, "packet processors 550" or "PPs 550"). Packet processors 550 may include, e.g., application-specific integrated circuit based packet processors ("ASICs") or any packet forwarding engine that execute the techniques described herein. Packet processors 550 include one or more programmable application-specific integrated circuits having a key engine 552 that executes microcode (or "microinstructions") to control and apply fixed hardware components of PP 550 to process packet "keys." A packet key includes packet fields and other parameters that determine a flow of packet processing for the packet along an internal processing path, such as paths 564. Key engine 552 includes key buffer 554 to store packet field data for corresponding packets that the key engine is currently processing. Key buffer 554 may also provide limited writable memory to which elements of the internal processing path may write to pass messages accessible by future elements. Some instances of PP 550 may include a plurality of key engines each having an associated key buffer.

Internal processing path 560 ("processing path 560") of PP 550 comprises programmable, executable microcode and fixed hardware components that determine the packet processing actions and other operations performed by key engine 552. PP 550 may store executable instructions of processing path 560 in computer-readable storage media, such as static random access memory (SRAM). While illustrated within PP 550, in some examples executable instructions of processing path 560 may be stored in memory external to PP 550 in forwarding component 410A.

In some aspects, processing path 560 includes a next hop data structure to initiate processing. At the end of each processing step by key engine 552, the result is a next hop that may specify additional processing or the termination of processing, for instance. In addition, next hops may specify one or more functions to be executed by key engine 552 and/or one or more hardware elements to be applied (e.g., policers). Key engine 552 may be associated with a result (or "lookup") buffer (not shown) that stores results for executing next hops. For example, key engine 552 may execute a lookup specified by a list of next hops and store the result of the lookup to the associated result buffer. The contents of a result buffer may affect the actions of the next hop.

Logical interfaces 562 ("IFLs 562") is a table or other data structure that includes one or more logical interfaces. Each of IFLs 562 is an interface to a processing path of paths 564. Paths 564 represents one or more processing paths for execution by key engine 552 on key buffer 554.

Forwarding component microprocessor 546 ("FC microprocessor 546") manages PP 550 and executes programming interface 544 to provide an interface for/to routing component 406. Programming interface 544 may comprise one or more user- or kernel-level libraries, programs, toolkits, application programming interfaces (APIs) and may communicate control and data messages to forwarding component 410A via internal communication link (e.g., communication link 418 of FIG. 4) using sockets, for example. FC microprocessor 546 may execute a microkernel 542 to provide an operating environment for interfaces. Programming interface 544 receives messages from routing component 406 directing forwarding component 410A to configure logical interfaces 562.

In operation, BFD daemon 514 of routing component 406 may select, for example, packet processor 550A of forwarding component 410A as a session master node and packet processor 550N as a session standby node. Similarly, BFD daemon 514 may select a packet processor of forwarding component 410N as a peer session master node and one or more packet processors as peer session standby nodes.

BFD daemon 514 may also establish active and passive forwarding plane connectivity detection sessions. For example, BFD daemon 514 may select session master nodes PP 550A and PP 550N to exchange session parameters, e.g., (My Discriminator, Your Discriminator, destination IP address, source IP address) that are unique to an active forwarding plane connectivity detection session between PP 550A and a peer session master node in forwarding component 410N. BFD daemon 514 may further synchronize the session parameters with session standby node PP 550N (e.g., illustrated as session parameters 549N) to establish a passive forwarding plane connectivity detection session to the peer session master node in forwarding component 410N. In some examples, the session parameters are synchronized in the forwarding plane 504 itself (e.g., PP 550A informing directly to PP 550N) or via a process in control plane 502 (e.g., kernel 530 or daemons 522), such as a control plane application(s) operating as a client to BFD daemon 514 to perform the session master and session standby node selection. In some examples, there may be multiple control plane applications operating as clients to perform the session master node selection, according to application-specific selection criteria. In this way, PP 550N may activate the passive forwarding plane connectivity detection session to the peer session master node in forwarding component 410N in the event PP 550A is down. Although illustrated as synchronizing session parameters from control plane 502, session parameters may alternatively be synchronized in forwarding plane 504.

In some examples, BFD daemon 514 may also detect the addition of packet processors in forwarding components 410. For example, BFD daemon 514 may determine that a new packet processor is installed on the lowest slot on forwarding component 410A. In this example, BFD daemon 514 may initiate a request to create a new active forwarding plane connectivity detection session between the new packet processor and the peer session master node in forwarding component 410N. BFD daemon 514 may also initiate the deletion of a previous active forwarding plane connectivity detection session between PP 550A and a peer session master node in forwarding component 410N.

Packet processors 550 may include session modules 548A-548N (collectively, "session modules 548"), respectively. Session modules 548 may exchange connectivity messages 554 (e.g., heartbeat messages) to determine the connectivity status of session master packet processor 550A. As one example, session module 548N may determine the state of logical interfaces 562N of packet processor 550N and include this information in connectivity message 554. In the event session module 548N does not receive a response for connectivity message 554 within a specified time interval, session module 548N may trigger a session master node selection process to select packet processor 550N as a new session master node and activate the passive forwarding plane connectivity detection session (based on the session parameters synchronized from BFD daemon 514 and stored in session module 548N) to the peer session master node in forwarding component 410N.

In some examples, session module 548N of session standby node PP 550N may include instructions by which control packets that are received from the peer session master node in forwarding component 410N are steered to local session master node PP 550A. As one example, session standby node PP 550N may receive a control packet from the peer session master node in forwarding component 410N and session module 548N may include instructions (i.e., filters) that cause session standby node PP 550N to steer the control packet to local session master node PP 550A.

In some examples, session module 548A of session master node PP 550A may include instructions by which status control packets (e.g., "Admin Down" control packets) are sent to the peer session master node in forwarding component 410N to notify the peer master session node that an aggregated interface is marked down. In some examples, session module 548A may include instructions by which the status control packet is broadcasted to peer session standby nodes to notify the peer session standby nodes in forwarding component 410N that the aggregated interface is marked down. Alternatively, or additionally, session module 548A of session master node PP 550A may receive status control packets from the peer session master node in forwarding component 410N. Session module 548A may mark the aggregated interface as operationally down and to trigger reroute. In some examples, session module 548A may broadcast the received status control packet to peer session standby nodes, e.g., PP 550N, to notify PP 550N that the aggregated interface is marked down.

Figure 7:
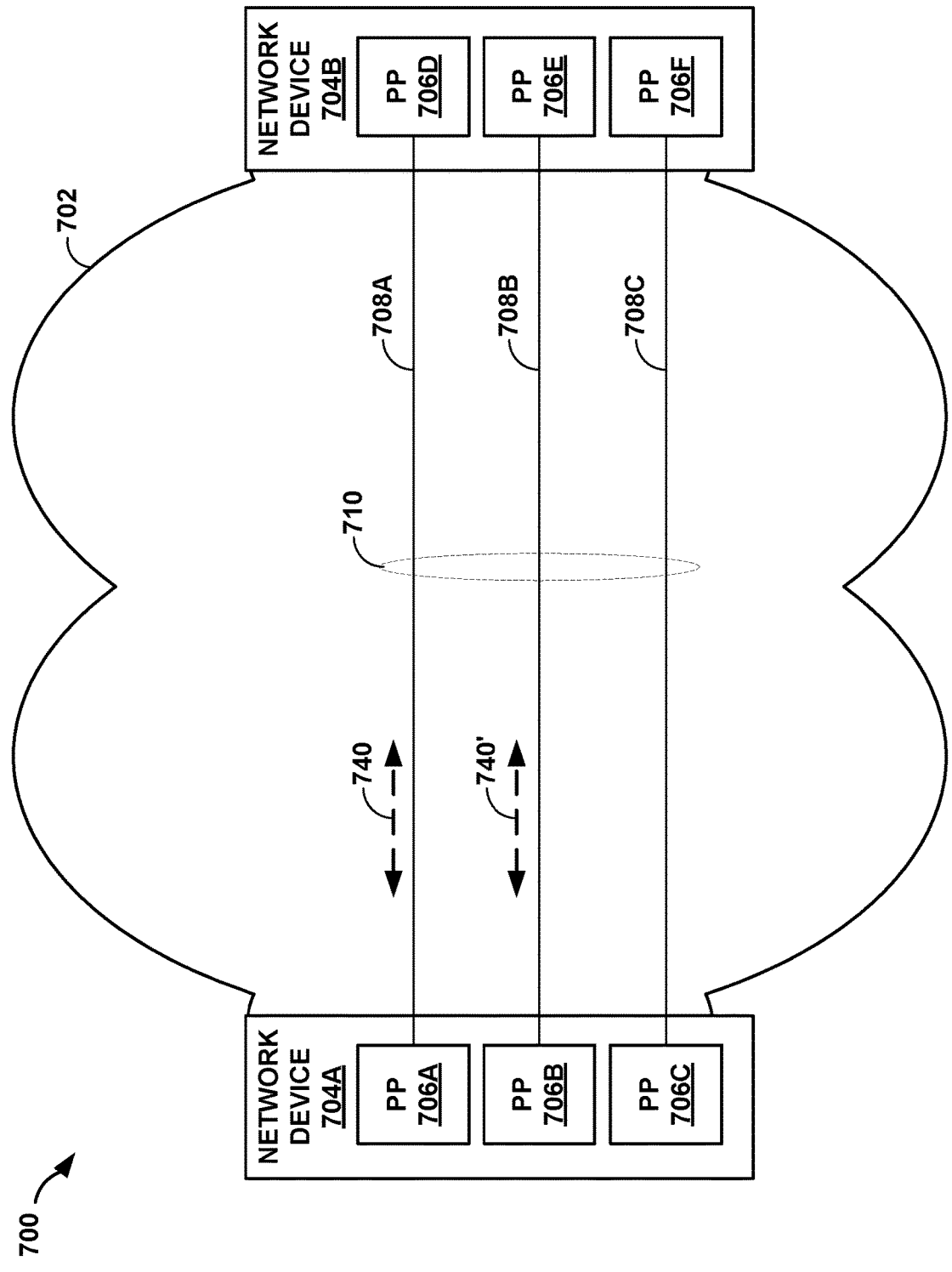
FIG. 7 is a block diagram illustrating another example network environment, in accordance with techniques described in this disclosure.

Although the above examples are illustrated with respect to active and passive forwarding plane connectivity detection sessions between packet processors of respective virtual network nodes, the above examples are similarly applicable to active and passive forwarding plane connectivity detection sessions between packet processors of different physical network devices (as further described in FIG. 7).

Figure 6A:
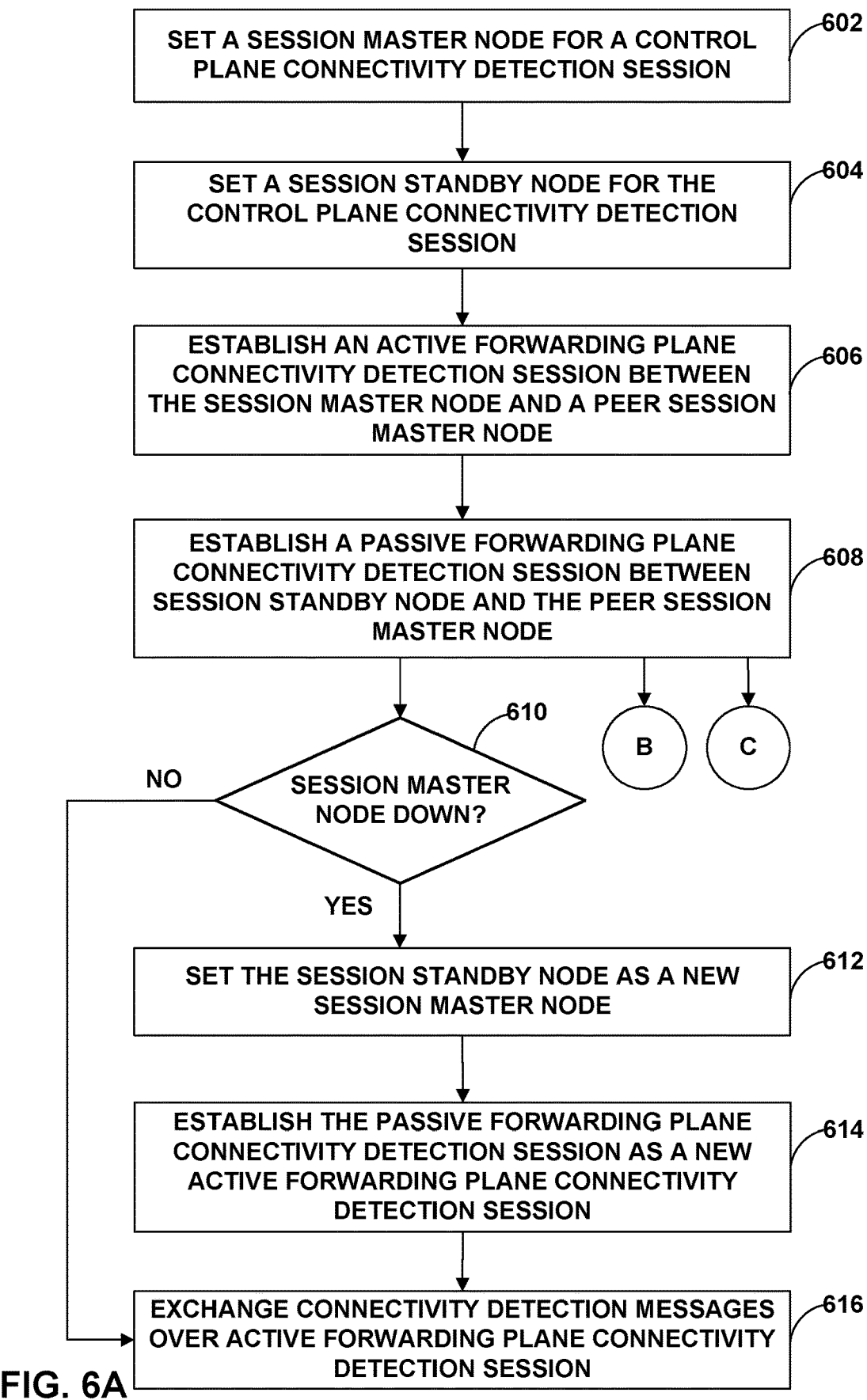
FIGS. 6A-6C are flowcharts illustrating example operations of a network device, in accordance with techniques described in this disclosure.
Figure 6B:
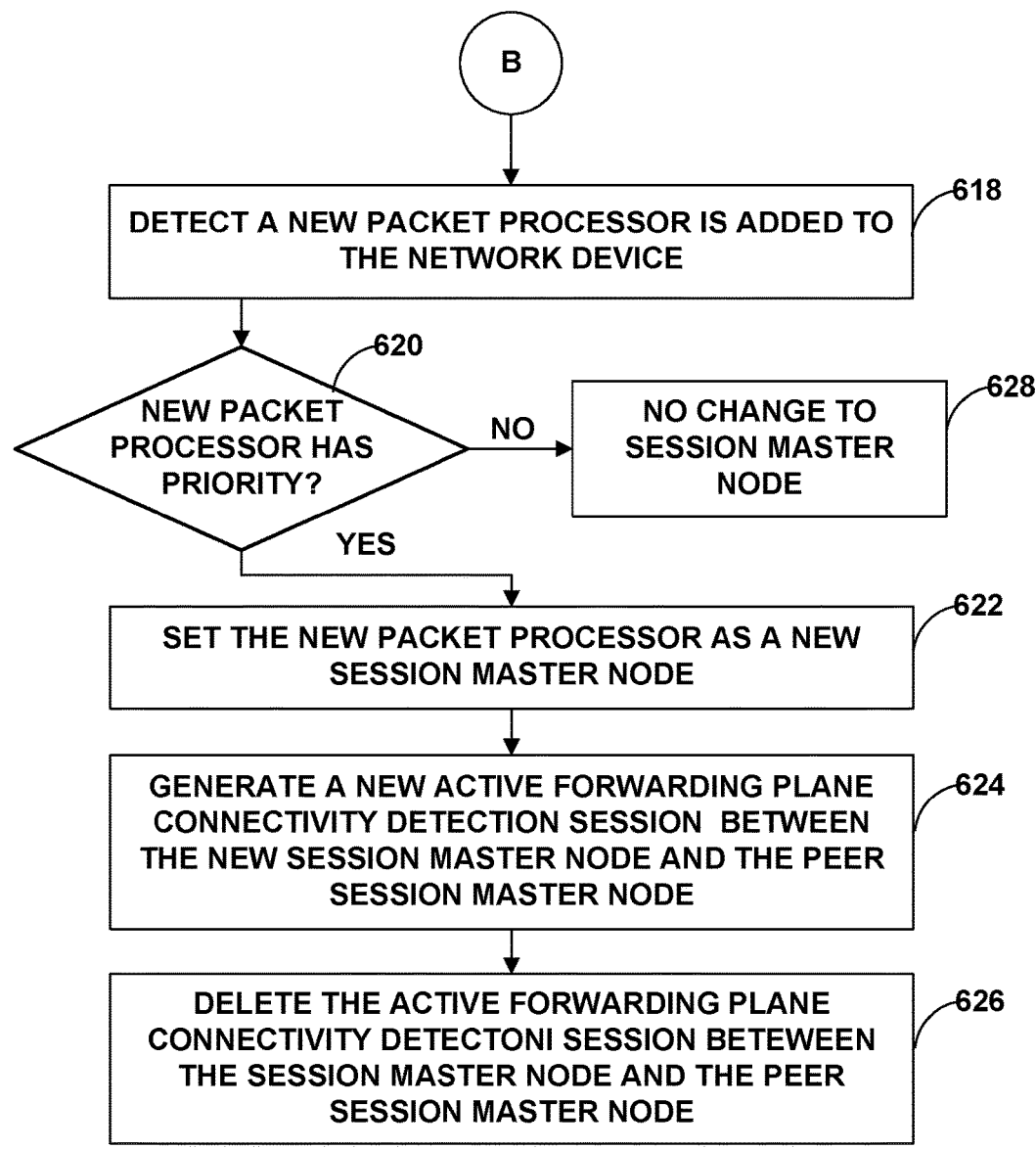
Figure 6C:
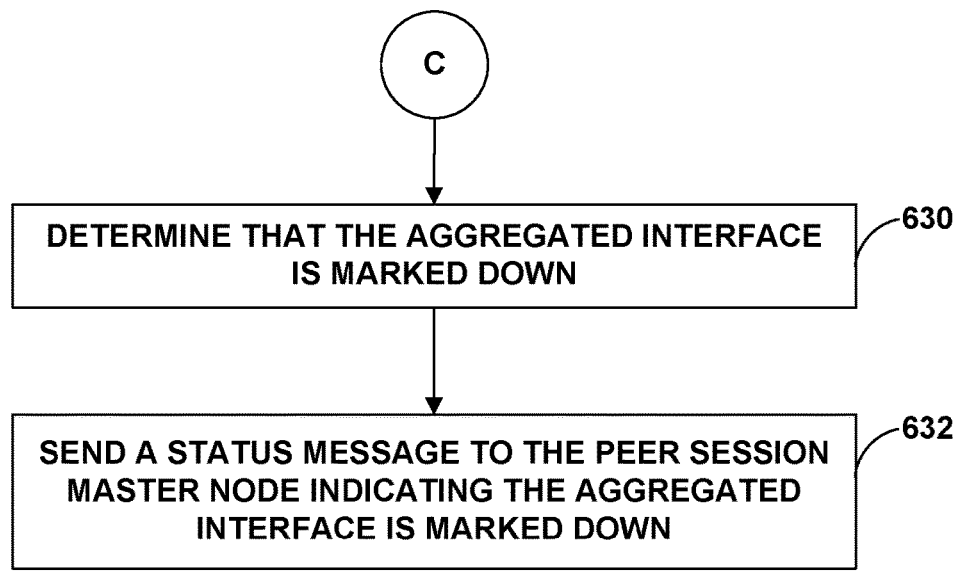

FIGS. 6A-6C are flowcharts illustrating example operations of network devices, in accordance with the techniques described in this disclosure. FIGS. 6A-6C are described for purposes of example with respect to network device 402 of FIG. 5, but may likewise be applied to network devices 704 of FIG. 7.

In the example of FIG. 6A, network device 402 may set a session master node for a control plane connectivity detection session (602). For example, BFD daemon 514 of network device 402 may set a packet processor, e.g., PP 550A, from among a plurality of packet processors as a session master node to manage a control plane connectivity detection session to detect connectivity failures of an aggregated interface. In some examples, the control plane connectivity detection session may be between respective packet processors of virtual network nodes interconnected by an abstract fabric interface having a plurality of fabric interconnects. In some examples, the control plane connectivity session may be between respective packet processors of different physical network devices interconnected by an aggregated Ethernet interface (e.g., Link Aggregation Groups) having a plurality of Ethernet links, such as in FIG. 7.

Network device 402 may set a session standby node for the control plane connectivity detection session (604). For example, BFD daemon 514 of network device 402 may set a packet processor, e.g., PP 550N, from among a plurality of packet processors as a session standby node to convert to a new session master node in the event of a failure to the session master node.

Network device 402 may establish an active forwarding plane connectivity detection session between the session master node and a peer session master node (606). For example, network device 402 may establish a single session between a session master node, e.g., PP 550A, and a peer session master node of a different network node. In some examples, the active forwarding plane connectivity detection session is a micro Bidirectional Forwarding Detection session in which BFD messages having BFD parameters are exchanged.

Network device 402 may establish a passive forwarding plane connectivity detection session between the session standby node and the peer session master node (608). For example, BFD daemon 514 of network device 402 may establish a passive session (i.e., non-active session) between session master node PP 550N and a peer session master node of a different network node such that the passive forwarding plane connectivity detection session may become active in the event of a failure of the current session master node PP 550A. In some examples, the passive forwarding plane connectivity detection session is established by synchronizing BFD parameters unique to the active forwarding plane connectivity detection session (i.e., storing the BFD parameters in session parameters 549N of session standby node PP 550N). These BFD parameters may include My Discriminator, Your Discriminator, source IP address, and destination IP address.

In some examples, the session standby node PP 550N may determine whether the session master node PP 550A is down (610). For example, PP 550N, via session module 548N, may send a connectivity message 554 (e.g., heartbeat message) to session module 548A of session master node PP 550A and determine whether a response to the heartbeat message was received within a specified time interval. If the response to the heartbeat message is received within a specified time interval ("YES" branch of step 610), the session master node PP 550A may continue to exchange connectivity detection messages over the active forwarding plane connectivity detection session (616).

If a response to the heartbeat message is not received within a specified time interface ("NO" branch of step 610), session standby node PP 550N may determine that session master node PP 550A is down. In this case, BFD daemon 514 of network device 402 may set the session standby node PP 550N as a new session master node (612). In some examples, BFD daemon 514 may set a packet processor installed in a next lowest slot as the new session master. The BFD daemon 514 may also establish the passive forwarding plane connectivity detection session as a new active forwarding plane connectivity detection session (614). In this case, the new session master node PP 550A may exchange connectivity detection messages over the newly active forwarding plane connectivity detection session (616).

In the example of FIG. 6B, network device 402 may also detect a new packet processor is added to the network device (618). The network device 402 may determine whether the new packet processor takes priority over the session master node (620). For example, BFD daemon 514 of network device 402 may determine that the new packet processor is installed in a lower slot of network device 402 relative to the packet processor associated with the session master node. If the new packet processor does not take priority over the session master node ("NO" branch of step 620), no change is made to the session master node (628).

If the new packet processor takes priority over the session master node ("YES" branch of step 620), BFD daemon 514 may set the new packet processor as a new session master node (622). BFD daemon 514 may also generate a new active forwarding plane connectivity detection session between the new session master node and the peer session master node (624). BFD daemon 514 may additionally delete the active forwarding plane connectivity detection session between the session master node and the peer session master node (626).

In the example of FIG. 6C, network device 402 may determine that the aggregated interface is marked down (630). In the event that the aggregated interface is marked down, e.g., by a configuration event, the session master node PP 550A, via session module 548A, may send a status message to the peer session master node indicating the aggregated interface is marked down to trigger a traffic reroute to avoid the aggregated interface (632). For example, one end of an interface is marked down by a configuration event and this configuration down event is communicated to the other end so that FRR can be triggered. Since this is a controlled event (configuration down) an AdminDown packet may be sent out out before bringing the interface down.

FIG. 7 is a block diagram illustrating another example of network environment, in accordance with the techniques described herein. In the example of FIG. 7, network system 700 includes network 702 that comprises a public network such as the Internet, a private network, such as those owned and operated by an enterprise or service provider, or a combination of both public and private networks. As a result, network 702 may be alternatively referred to herein as a Service Provider (SP) network. Network 702 may include one or more Wide Area Networks (WANs), Local Area Networks (LANs), Virtual Local Area Networks (VLANs), Virtual Private Networks (VPNs), and/or another type of network.

Network system 700 includes network devices 704A, 704B (collectively, "network devices 704"). Network devices 704 represent any network device, such as a router or switch, that routes or otherwise forwards network traffic. For instance, each of network devices 704 may represent a layer 2 (L2) or layer 3 (L3) packet-switching device that operates at L2/L3, respectively. In some examples, network devices 704 receive routing information describing a current topology of a connected network. That is each of network devices 704 may operate within the second layer (e.g., data link layer) or third layer (e.g., network layer) of the Open Systems Interconnection (OSI) reference model.

In some examples, network devices 704 process routing information, and select paths through their representation of the topology of the network to reach all available destinations to generate forwarding information. In other words, network devices 704 each reduces these paths to so-called "next-hops" which identify which of its interfaces traffic destined for a particular destination is to be forwarded, where the forwarding information includes this list of next hops. Each of network devices 704 then installs this forwarding information in a forwarding plane, whereupon the forwarding plane forwards received traffic in accordance with the forwarding information. In some examples, FIGS. 4 and/or 5 may be examples of network devices 704 in more detail, and the details described with respect to FIGS. 4 and 5 may be applied in the context of FIG. 7. In the case of L2 devices, network devices 704 may have a simplified architecture as compared to FIGS. 4 and 5, such as with less control-plane functionality.

As shown in the example of FIG. 7, network devices 704 are connected by links 708A-708C (collectively, "links 708"). Each of links 708 may represent a data path between distinct ports of network devices 704. For instance, links 708 may each be a physical link (e.g., wire cable or fiber) connecting ports of network devices 704. In other examples, links 708 may represent other links, such as label switched paths through a multiprotocol label switching (MPLS) network, or any other link through which routers 704 may communicate with one another. Each of links 708 may represent an Ethernet or other layer 2 link.

Network devices may include one or more packet processors, e.g., packet processors 706A-706F (collectively, "packet processors 706" or "PPs 706"). A packet processor of a network device interfaces with a respective link. In the example of FIG. 7, PP 706A interfaces with link 708A, PP 706B interfaces with link 708B, and PP 706C interfaces with link 708C. Similarly, PP 706D interfaces with link 708A, PP 706E interfaces with link 708B, and PP 706F interfaces with link 708C.

In some examples, two or more links 708 may be logically grouped or aggregated together to form an "aggregated bundle." In general, the term aggregated bundle may refer to a plurality of physical links that are treated, for purpose of routing and forwarding, as a single logical link. In the example of FIG. 7, links 708A-708C are combined into one logical interface to form aggregated interface 710 to interconnect network devices via two or more links. Aggregated interface 710 may be an aggregated Ethernet interface, a Logical Tunnel Interface, or other aggregated interface of physical links. In some examples, such as the example of FIG. 7, the physical links may interconnect two network devices. In other examples, the physical links may connect a physical device with multiple other devices such that the logical link may be viewed as a single link but provides connectivity to multiple, separate physical devices. Various protocols may be used to configure and maintain aggregated bundles. For instance, an aggregated bundle may be an aggregated Ethernet bundle, which may be configured and maintained using a link aggregation control protocol (LACP), such as that defined in IEEE 802.3AD, the entire contents of which are incorporated by reference herein. Logically, these aggregated bundles (which may also be referred to as "link aggregation groups" or "LAGs") enables physical interfaces, e.g., Ethernet interfaces, to form a single link layer interface. The LAG balances traffic across the member links, e.g., links 708, and increases bandwidth.

Each of network devices 706 includes multiple routing components (e.g., routing processes) and packet processors of a forwarding component that are physically coupled and configured to operate as separate logical routers. In accordance with the techniques described herein, network devices 706 may select session master nodes and session standby nodes such that only a single control plane connectivity detection session is active for detecting connectivity failures of an aggregated interface. For example, during initialization, network device 704A may initiate a session master node selection process to select packet processor 706A as a session master node for aggregated interface 710 and select packet processors 706B and 706C as session standby nodes for network device 704A. Similarly, network device 704B may initiate a session master node selection process to select packet processor 706D as a session master node for aggregated interface 710 and packet processors 706E and 706F as session standby nodes for network device 704B. The session master nodes are set up to manage an active forwarding plane connectivity detection session, e.g., active mBFD session 740, to detect connectivity failures of a multipoint-to-multipoint interface, e.g., aggregated interface 710. That is, session master nodes PP 706A and PP 706D are set up to exchange connectivity detection messages, e.g., BFD messages, on only the active forwarding plane connectivity detection session 740 to detect connectivity failures of aggregated interface 710. In some examples, instead of selecting packet processors as the master or standby nodes, Network Interface Cards (NICs) or software instances on the NICs would be selected as the master or standby nodes.

By implementing a single active mBFD session 740, each of session master nodes, e.g., PP 706A and PP 706D, may send the control packet directly to its peer session master node. For example, session master node PP 706A may include information (i.e., knowledge of end nodes, peer nodes, etc.) about session master node PP 706D such that session master node PP 706A may send a control packet directly to session master node PP 706D. Similarly, session master node PP 706D may include information about session master node PP 706A such that session master node PP 706D may send a control packet directly to session master node PP 706A.

Alternatively, or additionally, if the peer session master node is unknown, session master node PP 706A may load balance a control packet (e.g., mBFD control packet) to any of PPs 706D-706F, which is then steered upon receipt to the session master node where the mBFD state machine is running. For example, session standby nodes PP 706E and PP 706F may each be configured to steer (e.g., using filters) a control packet received from session master node PP 706A to local session master node PP 706D. Similarly, session master node PP 706D may load balance a control packet to any of PPs 706BA-706C. If session standby node PP 706B receives the control packet, session standby node PP 706B may steer the control packet to the local session master node, e.g., PP 706A.

Alternatively, or additionally, each of session master nodes PP 706A and PP 706D may run in BFD "echo mode." For example, session master node PP 706D may generate an echo control packet that is forwarded to any of PPs 706A-706C, which in turn sends the echo control packet back along the same path to session master node PP 706D (i.e., loopback by the peer forwarding element having an active or passive mBFD session). Similarly, session master node PP 706A may generate an echo control packet that is forwarded to any of PPs 706D-706F, which in turn sends the echo control packet back along the same path to session master node PP 706A. In any event, session master nodes PP 706A and PP 706D are configured to transmit and receive connectivity detection messages for detecting connectivity failures of aggregated interface 710 without having to establish mBFD sessions for each of link 708.

In the example of FIG. 7, session standby nodes, e.g., PPs 706B and PP 706C, of network device 704A may determine whether the local session master node PP 706A is down, and if the session master node is down, the session standby nodes PP 70B and/or PP 706C may inform the control plane of network device 704A to trigger a session master node selection process as described herein in which a local session standby node is converted to a new session master node.

As one example, network device 704A may establish a passive forwarding plane connectivity detection session 740' between session standby node PP 706B of network device 704A and a peer session master node PP 706D of network device 704C. To establish passive forwarding plane connectivity detection session 740', session parameters (e.g., BFD parameters) unique to the active forwarding plane connectivity detection session 740 may be synchronized to each of session standby nodes PP 706B and PP 706C of network device 704A. By synchronizing the BFD session parameters, the session standby nodes of network device 704A are capable of activating the passive forwarding plane connectivity detection session 740' in the event the current session master node PP 706A goes down.

In some examples, a user may add a new packet processor in network device 704A that would take priority in the selection process as a new session master node. As described above with respect to FIG. 2, network device 704A may similarly shift the active forwarding plane connectivity detection session 740 from a current session master node to the new session master node of network device 704A, using, for example, Make Before Break (MBB) techniques.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A method comprising:
setting, by a network device, a session master node for a control plane connectivity detection session between two of a plurality of network nodes, wherein the plurality of network nodes is interconnected by an aggregated interface having a plurality of links;
setting, by the network device, a session standby node, locally connected to the session master node of a first network node of the plurality of network nodes, for the control plane connectivity detection session;
establishing, by the network device, an active forwarding plane connectivity detection session between the session master node of the first network node and a peer session master node of a second network node of the plurality of network nodes, wherein the active forwarding plane connectivity detection session detects connectivity failures of the aggregated interface;
establishing a passive forwarding plane connectivity detection session between the session standby node and the peer session master node; and
exchanging connectivity detection messages over the active forwarding plane connectivity detection session without exchanging connectivity detection messages over the passive forwarding plane connectivity detection session;
in response to determining, by the session standby node, that the session master node is down, setting, by the network device, the session standby node as a new session master node for the first network node; and
establishing, by the network device, the passive forwarding plane connectivity detection session as a new active forwarding plane connectivity detection session.

2. The method of claim 1, wherein the connectivity detection messages comprise Bidirectional Forwarding Detection messages.

3. The method of claim 1, wherein the active forwarding plane connectivity detection session and the passive forwarding plane connectivity detection session are active and passive micro bidirectional forwarding detection sessions, respectively.

4. The method of claim 1,
wherein the network nodes are virtual network nodes within a single physical network device chassis,
wherein the links comprise fabric interconnects within a switch fabric of the single physical network device chassis, and
wherein the aggregated interface comprises an abstract fabric interface.

5. The method of claim 1,
wherein the network nodes are separate physical network devices,
wherein the links comprise Ethernet links, and
wherein the aggregated interface comprises a Link Aggregation Group (LAG).

6. The method of claim 1, wherein establishing the passive forwarding plane connectivity detection session between the session standby node and the peer session master node comprises synchronizing session parameters associated with the active forwarding plane connectivity detection session to the session standby node.

7. The method of claim 6, wherein the session parameters comprise Bidirectional Forwarding Detection parameters including My Discriminator, Your Discriminator, source IP address, and destination IP address.

8. The method of claim 1, wherein determining whether the session master node is down comprises:
sending, by the session standby node and to the session master node, a heartbeat message; and
determining, by the session standby node, that a response to the heartbeat message was not received within a specified time interval.

9. The method of claim 1,
wherein the plurality of network nodes each comprise a plurality of packet processors, and
wherein setting the session standby node as the new session master node comprises setting, as the new session master node, that packet processor of the plurality of packet processors which is installed in a next lowest slot of the first network node.

10. The method of claim 1, wherein the plurality of network nodes each comprise a plurality of packet processors, further comprising:
detecting a new packet processor is added to the first network node;
in response to determining that the new packet processor takes priority over the session master node, setting the new packet processor as a new session master node for the first network node;
generating a new active forwarding plane connectivity detection session between the new session master node and the peer session master node; and
deleting the active forwarding plane connectivity detection session between the session master node and the peer session master node.

11. The method of claim 10, wherein determining that the new packet processor takes priority over the session master node comprises determining that the new packet processor is installed in a lowest slot of the first network node.

12. The method of claim 1, further comprising:
determining that the aggregated interface is down; and
sending a status message to the peer session master node indicating the aggregated interface is down to trigger a traffic reroute to avoid the aggregated interface.

13. The method of claim 1,
wherein the plurality of network nodes each comprise a plurality of packet processors,
wherein setting the session master node for the control plane connectivity detection session comprises setting, as the session master node, that packet processor of the plurality of packet processors which is installed in a lowest slot of the network device.

14. A method comprising:
setting, by a network device having a plurality of virtual network nodes and an abstract fabric interface that logically connects a plurality of packet processors of the network device respectively assigned to a first virtual network node and a second virtual network node of the plurality of virtual network nodes, a first packet processor of the plurality of packet processors as a session master node for a control plane connectivity detection session for the abstract fabric interface;
setting, by the network device, a second packet processor of the plurality of packet processors as a session standby node, locally connected to the session master node of the first virtual network node, for the control plane connectivity detection session;
establishing, by the network device, an active forwarding plane connectivity detection session between the session master node of the first virtual network node and a peer session master node of the second virtual network node, wherein the active forwarding plane connectivity detection session detects connectivity failures of the abstract fabric interface;
establishing, by the network device, a passive forwarding plane connectivity detection session between the session standby node and the peer session master node; and
exchanging connectivity detection messages over the active forwarding plane connectivity detection session without exchanging connectivity detection messages over the passive forwarding plane connectivity detection session;
in response to determining, by the session standby node, that the session master node is down, setting, by the network device, the session standby node as a new session master node for the first virtual network node; and
establishing, by the network device, the passive forwarding plane connectivity detection session as a new active forwarding plane connectivity detection session.

15. The method of claim 14, wherein establishing the passive forwarding plane connectivity detection session between the session standby node and the peer session master node comprises synchronizing, by the network device, session parameters associated with the active forwarding plane connectivity detection session to the session standby node.

16. The method of claim 14, wherein determining whether the session master node is down comprises:
sending, by the session standby node and to the session master node, a heartbeat message; and
determining, by the session standby node, that a response to the heartbeat message was not received within a specified time interval.

17. The method of claim 14, wherein setting the session standby node as the new session master node comprises setting, as the new session master node, that packet processor of the plurality of packet processors which is installed in a next lowest slot of the network device.

18. The method of claim 14, further comprising:
   detecting, by the network device, a new packet processor is added to the network device;
   in response to determining that the new packet processor takes priority over the session master node, setting, by the network device, the new packet processor as a new session master node for the first virtual network node;
   generating, by the network device, a new active forwarding plane connectivity detection session between the new session master node and the peer session master node; and
   deleting, by the network device, the active forwarding plane connectivity detection session between the session master node and the peer session master node.

19. The method of claim 18, wherein determining that the new packet processor takes priority over the session master node comprises determining that the new packet processor is installed in a lowest slot of the network device.

20. The method of claim 14, further comprising:
   determining, by the network device, that the abstract fabric interface is down; and
   sending, by the session master node and to the peer session master node, a status message indicating the abstract fabric interface is down to trigger a traffic reroute to avoid the abstract fabric interface.

21. The method of claim 14, wherein selecting the session master node from the packet processor of the plurality of packet processors comprises setting, as the session master node, that packet processor of the plurality of packet processors which is installed in a lowest slot of the network device.

22. The method of claim 14, wherein the abstract fabric interface includes a plurality of fabric interconnects.

23. The method of claim 14, wherein the active forwarding plane connectivity detection session and the passive forwarding plane connectivity detection session are active and passive micro bidirectional forwarding detection sessions, respectively.

24. A network device comprising:
   a plurality of packet processors;
   an aggregated interface having a plurality of links coupling respective pairs of the plurality of packet processors at respective interfaces of a plurality of network nodes;
   a first packet processor of the plurality of packet processors set as a session master node for a control plane connectivity detection session between two of the plurality of network nodes, wherein the session master node comprises an active forwarding plane connectivity detection session established between the session master node of a first network node of the plurality of network nodes and a peer session master node of a second network node of the plurality of network nodes, and wherein the session master node configured to:
      detect connectivity failures of the aggregated interface, and
      exchange connectivity detection messages over the active forwarding plane connectivity detection session without exchanging connectivity detection messages over the passive forwarding plane connectivity detection session; and
   a second packet processor of the plurality of packet processors set as a session standby node, locally connected to the session master node of the first network node, for the control plane connectivity detection session, wherein the session standby node comprises a passive forwarding plane connectivity detection session between the session standby node and the peer session master node, wherein the session standby node configured to:
      determine whether the session master node is down,
      in response to determining that the session master node is down, set the session standby node as a new session master node for the first network node, and
      establish the passive forwarding plane connectivity detection session as a new active forwarding plane connectivity detection session.

25. The network device of claim 24, wherein the connectivity detection messages comprise Bidirectional Forwarding Detection messages.

26. The network device of claim 24, wherein the active forwarding plane connectivity detection session and the passive forwarding plane connectivity detection session are micro bidirectional forwarding detection sessions.

27. The network device of claim 24,
   wherein the network nodes are virtual network nodes within a single physical network device chassis,
   wherein the links comprise fabric interconnects within a switch fabric of the single physical network device chassis, and
   wherein the aggregated interface comprises an abstract fabric interface.

28. The network device of claim 24,
   wherein the network nodes are separate physical network devices,
   wherein the links comprise Ethernet links, and
   wherein the aggregated interface comprises a Link Aggregation Group (LAG).

29. The network device of claim 24, wherein, to establish the passive forwarding plane connectivity detection session between the session standby node and the peer session master node, the session standby node is further configured to synchronize session parameters associated with the active forwarding plane connectivity detection session to the session standby node.

30. The network device of claim 29, wherein the session parameters comprise Bidirectional Forwarding Detection parameters including My Discriminator, Your Discriminator, source IP address, and destination IP address.

31. The network device of claim 24, wherein, to determine whether the session master node is down, the session standby node is further configured to:
   send a heartbeat message to the session master node; and
   determine that a response to the heartbeat message was not received within a specified time interval.

32. The network device of claim 24, wherein, to set the session standby node as the new session master node for the first network node, the session standby node is further configured to set, as the new session master node, that packet processor of the plurality of packet processors which is installed in a next lowest slot of the network device.

33. The network device of claim 24, wherein the network device is configured to:
   detect a new packet processor is added to the network device;
   in response to determining that the new packet processor takes priority over the session master node, set the new packet processor as a new session master node for the first network node;
   generate a new active forwarding plane connectivity detection session between the new session master node and the peer session master node; and delete the active forwarding plane connectivity detection session between the session master node and the peer session master node.

34. The network device of claim 33, wherein, to determine that the new packet processor takes priority over the session master node, the network device is further configured to determine the new packet processor is installed in a lowest slot of the network device.

35. The network of claim 24, wherein the session master node is further configured to:
 determine that the aggregated interface is down; and
 send a status message to the peer session master node indicating the aggregated interface is down to trigger reroute to avoid the aggregated interface.

* * * * *